Aug. 23, 1932.  W. J. ANDRES  1,872,870
LEVER
Filed Sept. 6, 1928

INVENTOR.
William J. Andres
BY
ATTORNEY

Patented Aug. 23, 1932

1,872,870

UNITED STATES PATENT OFFICE

WILLIAM J. ANDRES, OF SOUTH BEND, INDIANA, ASSIGNOR TO BENDIX BRAKE COMPANY, OF SOUTH BEND, INDIANA, A CORPORATION OF ILLINOIS

LEVER

Application filed September 6, 1928. Serial No. 304,133.

This invention relates to a shaft operating mechanism and is illustrated as embodied in a novel crank or lever adjustably connected to the shaft.

An object of the invention is to provide a simple operating means which is capable of ready angular adjustment about the shaft, the same being quite inexpensive of manufacture.

In one desirable arrangement, the novel lever includes two parts, preferably forgings or the like, mounted on a power transmission shaft, one of which is fixedly secured to the shaft, preferably by a split boss construction, and is formed with a lug or boss housing an adjusting screw, the latter co-operating with a boss on the second part of the lever which is loosely sleeved on the shaft. Preferably the split boss lies on the opposite side of the shaft from the lug housing the adjusting screw and the boss on the loosely sleeved lever preferably is projected laterally therefrom in juxtaposition to the first-mentioned lug, the whole resulting in an efficient, compact arrangement of the parts.

Figure 1:
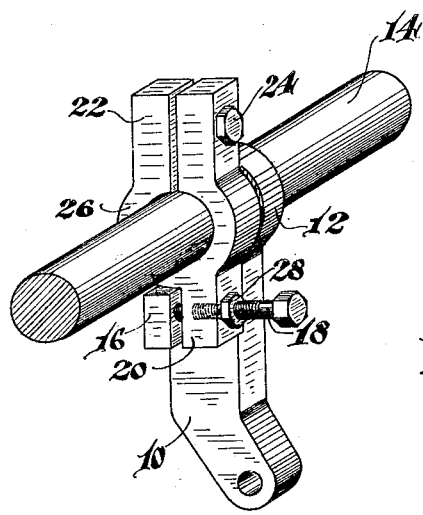
Figure 2:
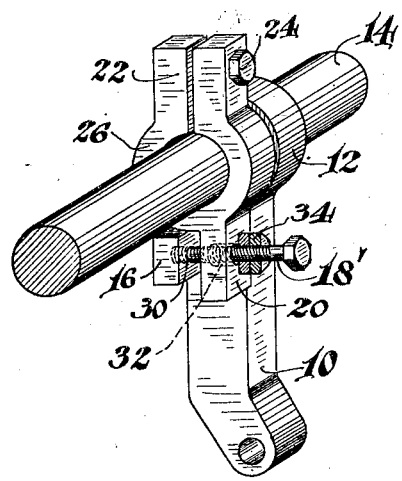

Other objects and features of the invention, including various desirable particular constructions, will be apparent from the following description of two illustrative embodiments shown in the accompanying drawing, in which:

Figure 1 indicates one embodiment of my novel two-part lever with its shaft, and Figure 2 indicates a second embodiment of the invention.

In the arrangement selected for illustration in Figure 1, 10 denotes the longer part of the crank or lever preferably of rectangular outline and freely sleeved at its enlarged end 12 on a cylindrical power transmission shaft 14. Part 10 is preferably provided with a laterally projecting lug 16 extending from one edge of the part as clearly disclosed in the drawing, which lug may be engaged by an adjusting screw 18 threaded through a lug 20 constituting one end of the second part 22 of the lever.

Part 22 is preferably in the form of a rectangular sectioned split block and is rigidly clamped by the screw 24 to the shaft, its cylindrical enlargement 26 being in contiguous relation to the corresponding part 12 on the other section of the lever. A locking nut 28 retains the adjustment of the screw 18 within the lug 20, which screw serves to determine the relative position of the lever parts, thus effecting the desired operative angular relation of the lever as a whole with respect to the shaft.

The modification disclosed in Figure 2 is similar to that disclosed in Figure 1 with the exception that the relative position of the lever parts is determined by a screw 18' threaded at 30 into boss 16 passing freely through an opening 32 in the boss 20 and held in its position of adjustment by the lock nuts 34 threaded onto the screw.

By this simple expedient the angular relation of the operating crank arm or lever with respect to the shaft may be expeditiously effected by the mere turning of the adjusting screw.

While two illustrative embodiments of my invention have been described in detail, it is not my intention to limit its scope to those particular embodiments, or otherwise than by the terms of the appended claims.

The invention heretofore described constitutes a continuation in part of subject-matter embraced within my earlier filed and co-pending applications numbered 46,040, filed July 25, 1925, and 32,631, filed May 25, 1925.

I claim:

1. A crank structure in two parts, one part consisting of an enlarged central portion, a boss portion at one side of said enlargement and a split boss at the other side thereof, said other lever part including at one end thereof an enlargement in contiguous relation to the aforementioned enlargement and a relatively long tension arm extending from said enlargement, together with means for positively connecting said parts, said means including a boss projecting from the second lever part and a screw threaded into one boss and freely extending through an opening in the remaining boss.

2. A crank structure in two parts, one said part comprising an enlarged central portion and a boss portion at one side of said enlargement, and the other said part including at one end thereof an enlargement in contiguous relation to the aforementioned enlargement and at the opposite end a relatively long arm extending from said enlargement, together with means for positively connecting said parts, said means including a boss projecting from the second part and a screw threaded into one boss and freely extending through an opening in the remaining boss.

In testimony whereof, I have hereunto signed my name.

WILLIAM J. ANDRES.